US006554469B1

United States Patent
Thomson et al.

(10) Patent No.: US 6,554,469 B1
(45) Date of Patent: Apr. 29, 2003

(54) FOUR CURRENT TRANSISTOR TEMPERATURE SENSOR AND METHOD

(75) Inventors: David Thomson, Fremont, CA (US); John Blake, Limerick (IE); Lorcan Mac Manus, Co. Kildare (IE)

(73) Assignee: Analog Devices, Inc., Norwood, MA (US)

( * ) Notice: Subject to any disclaimer, the term of this patent is extended or adjusted under 35 U.S.C. 154(b) by 80 days.

(21) Appl. No.: 09/837,816

(22) Filed: Apr. 17, 2001

(51) Int. Cl.[7] .............................. H01L 35/00; G07K 7/01
(52) U.S. Cl. ........................ 374/178; 327/512; 327/513; 374/163; 374/183
(58) Field of Search .................... 374/163, 183, 374/178; 702/64–65, 130, FOR 103–105; 327/512, 513

(56) References Cited

U.S. PATENT DOCUMENTS

| 5,195,827 A | | 3/1993 | Audy et al. ................ 374/172 |
| 5,453,682 A | * | 9/1995 | Hinrichs et al. ............ 324/132 |
| 5,993,060 A | * | 11/1999 | Sakurai ...................... 374/178 |
| 6,008,685 A | * | 12/1999 | Kunst ........................ 327/512 |
| 6,332,710 B1 | * | 12/2001 | Aslan et al. ................ 374/183 |

* cited by examiner

Primary Examiner—Diego Gutierrez
Assistant Examiner—Gail Verbitsky
(74) Attorney, Agent, or Firm—Koppel, Jacobs, Patrick & Heybl

(57) ABSTRACT

A four current transistor temperature sensor comprises a p-n junction, preferably the base-emitter junction of a bipolar transistor, which is driven with four different currents in a predetermined sequence. Each of the four currents induces a respective base-emitter voltage, which is measured. The temperature of the transistor is calculated based on the values of the four driving currents and the four measured base-emitter voltages. The four driving currents (I1, I2, I3 and I4) are preferably arranged such that $I1=2*I3$, $I2=2*I4$, $I1/I2=A$ and $I3/I4=A$, where A is a predetermined current ratio. I1 and I2 produce respective base-emitter voltages which are subtracted from each other to produce $\Delta V_{be1}$, and I3 and I4 produce respective base-emitter voltages which are subtracted from each other to produce $\Delta V_{be2}$. When so arranged, the difference between $\Delta V_{be1}$ and $\Delta V_{be2}$ is entirely due to the effect of series base and emitter resistances $r_b$ and $r_e$. Therefore, the $\Delta V_{be1}-\Delta V_{be2}$ value provides a correction factor which enables temperature measurement errors due to $r_b$ and $r_e$ to be eliminated.

12 Claims, 3 Drawing Sheets

FOUR CURRENT TRANSISTOR TEMPERATURE SENSOR AND METHOD

BACKGROUND OF THE INVENTION

1. Field of the Invention

This invention relates to the field of transistor temperature sensors, and particularly to methods of reducing measurement errors due to intrinsic base and emitter resistances in such sensors.

2. Description of the Related Art

Numerous circuit devices, such as transistors, diodes and resistors, have operating characteristics that are temperature dependent. Because of their temperature dependencies, such devices are extensively used as temperature sensors. For example, germanium and silicon diodes can be operated at a constant forward-biased current, and the resulting forward-biased voltage measured to determine the temperature in accordance with the standard forward-biased diode equation:

$$V = kT/q \ln I/I_s$$

where V is the forward-biased voltage, k is Boltzmann's constant, q is the electron charge, T is the absolute temperature in degrees Kelvin, I is the forward-biased current and $I_s$ is the diode's saturation current.

In practice, the measurement of temperature with a diode is subject to several inaccuracies. The precise voltage-temperature relationship depends upon the actual details of the junction, notably the doping densities on either side of the junction, the dopant profiles and the junction area, as well as secondary considerations such as bulk and surface defects in the material. These factors are difficult to quantify with certainty, and many of the parameters in the device equations (such as mobility) are themselves temperature-dependent. Other effects, such as conductivity modulation and series resistances, can also complicate the device's behavior.

Another approach employs two separate junctions which are fabricated on the same substrate, but which are operated at different current densities. This eliminates the effects of variations in doping levels and in the value of the bandgap voltage. The dual junction approach has been implemented with a pair of bipolar transistors whose emitter areas are in the ratio A. The difference in collector current densities gives rise to a difference in the base-emitter voltages for the two transistors. The relationship between the base-emitter voltage differential ($\Delta V_{be}$) and the device temperature is given by the expression:

$$\Delta V_{be} = kT/q \ln A$$

While this approach offers significant advantages over the single junction temperature measurement, it still has some limitations. There is a certain amount of tolerance in the transistor fabrication, which introduces an ambiguity into the emitter area ratio. Furthermore, the accuracy of the equation is reduced by ohmic resistances associated with the junction, specifically the base resistance $r_b$ and the emitter resistance $r_e$. The base and emitter resistances may be considered to include both the intrinsic resistances inherent in the device, and the resistances associated with connecting lines. Calibration of such a sensor is required for most applications, and the fact that at least a pair of junctions are required introduces the possibility that differential strain across the substrate could result in poor tracking of junction voltages with a consequent error in the small $\Delta V_{be}$ voltage.

Another technique is described in U.S. Pat. No. 5,195,827 to Audy et al. Here, a single bipolar transistor is sequentially driven with three different currents, inducing three base-emitter voltages which are measured and used to calculate temperature. This approach also has significant shortcomings, however. Using three currents requires that the ratios between the currents be kept small, in order to avoid heating up the sensing transistor and thereby introducing error into the temperature measurement. Also, the calculations necessitated by a three-current approach are likely to require non-integer math, which can be difficult and/or impractical to implement.

SUMMARY OF THE INVENTION

A four current transistor temperature sensor and method are presented which overcome the problems noted above. The invention allows the use of large current ratios and simple temperature calculations, while still reducing or eliminating intrinsic base and emitter resistance errors.

A p-n junction, preferably the base-emitter junction of a bipolar transistor, is driven with four different currents in a predetermined sequence. Each of the four currents induces a respective base-emitter voltage, which is measured. The temperature of the transistor is calculated based on the values of the four driving currents and the four measured base-emitter voltages.

In a preferred embodiment, the four driving currents (I1, I2, I3 and I4) are arranged such that I1=n*I3, I2=n*I4, I1/I2=A and I3/I4=A, where A is a predetermined current ratio. In operation, I1 and I2 produce respective base-emitter voltages which are subtracted from each other to produce $\Delta V_{be1}$, and I3 and I4 produce respective base-emitter voltages which are subtracted from each other to produce $\Delta V_{be2}$. When so arranged, the difference between $\Delta V_{be1}$ and $\Delta V_{be2}$ is entirely due to the effect of series base and emitter resistances $r_b$ and $r_e$. The $\Delta V_{be1} - \Delta V_{be2}$ value thus provides a correction factor which enables temperature measurement errors due to $r_b$ and $r_e$ to be eliminated. This arrangement also allows the use of large currents ratios, and greatly simplifies the calculations required to determine temperature T.

DETAILED DESCRIPTION OF THE INVENTION

Figure 1:
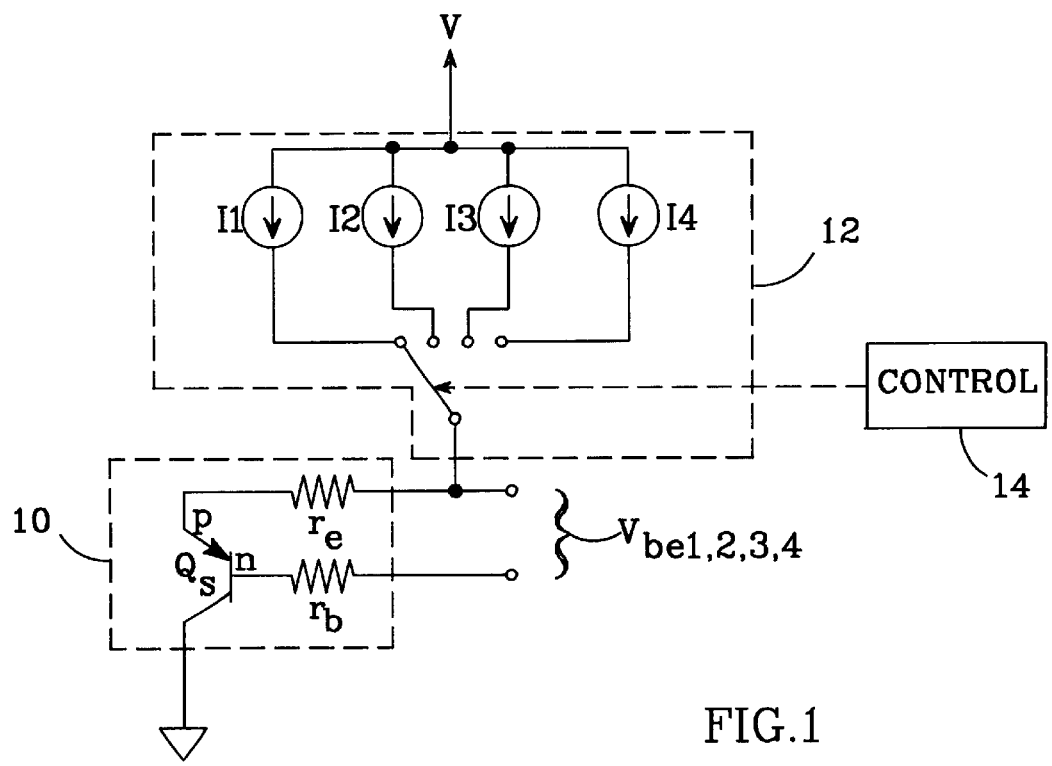
FIG. 1 is a schematic diagram illustrating the basic principles of a transistor temperature sensor per the present invention.

A four current transistor temperature sensor per the present invention is shown in FIG. 1. A p-n junction 10 is employed as a temperature sensor. P-n junction 10 is preferably a bipolar transistor $Q_s$, but other bipolar devices, such as a junction or Schottky diode, could also be used.

As indicated in FIG. 1, bipolar transistor $Q_s$ has an associated series base resistance $r_b$ and a series emitter resistance $r_e$. These resistances may be due to the intrinsic properties of the p-n junction itself, as well as lead and connection resistances. As noted above, these resistances often degrade the accuracy of prior art temperature sensors which employ a p-n junction as a sensing element.

The present sensor is arranged to provide four different currents through p-n junction 10, each of which induces a respective voltage across the junction. As shown in FIG. 1, a current source 12 is arranged to provide currents I1, I2, I3 and I4 to sensor transistor $Q_s$ in a predetermined sequence, which induces voltages $V_{be1}$, $V_{be2}$, $V_{be3}$ and $V_{be4}$, respectively, across the transistor's base-emitter junction.

Temperature can be determined by calculating the difference between the base-emitter voltages induced by two different currents. By measuring $V_{be1}$ with current I1 applied to transistor $Q_s$, and measuring $V_{be2}$ with current I2 applied, the difference $\Delta V_{be1}$ between $V_{be1}$ and $V_{be2}$ is given by:

$$\Delta V_{be1}=(kT/q)*\ln[(I1/(1+(1/\beta)))/I_s]+I1*r_e+(I1/\beta)*r_b-(kT/q)*\ln[(I2/(1+(1/\beta)))/I_s]-I2*r_e-(I2/\beta)*r_b \text{ volts} \quad \text{(Eq. 1)}$$

where k is Boltzmann's constant, q is the electron charge, T is the absolute temperature in degrees Kelvin, $I_s$ is the transistor's saturation current, and $\beta$ is the transistor's gain. This simplifies to:

$$\Delta V_{be1}=kT/q \ln(I1/I2)+(I1-I2)*(r_e+(r_b/\beta)) \quad \text{(Eq. 2)}$$

Similarly, $V_{be3}$ and $V_{be4}$ are measured with currents I3 and I4 applied, respectively, with the difference $\Delta V_{be2}$ between $V_{be3}$ and $V_{be4}$ given by:

$$\Delta V_{be2}=kT/q \ln(I3/I4)+(I3-I4)*(r_e+(r_b/\beta)) \quad \text{(Eq. 3)}$$

If $r_b$, $r_e$ and $\beta$ are known, either of equations 2 and 3 could be used to determine the temperature of transistor $Q_s$. With each expression requiring the application of only two currents, the I1/I2 or I3/I4 ratios can be larger than would be permissible with a three-current scheme, and still not unacceptably heat the transistor. The larger current ratios provide a larger $\Delta V_{be}$, which tends to increase the accuracy of the measurement.

Figure 2:
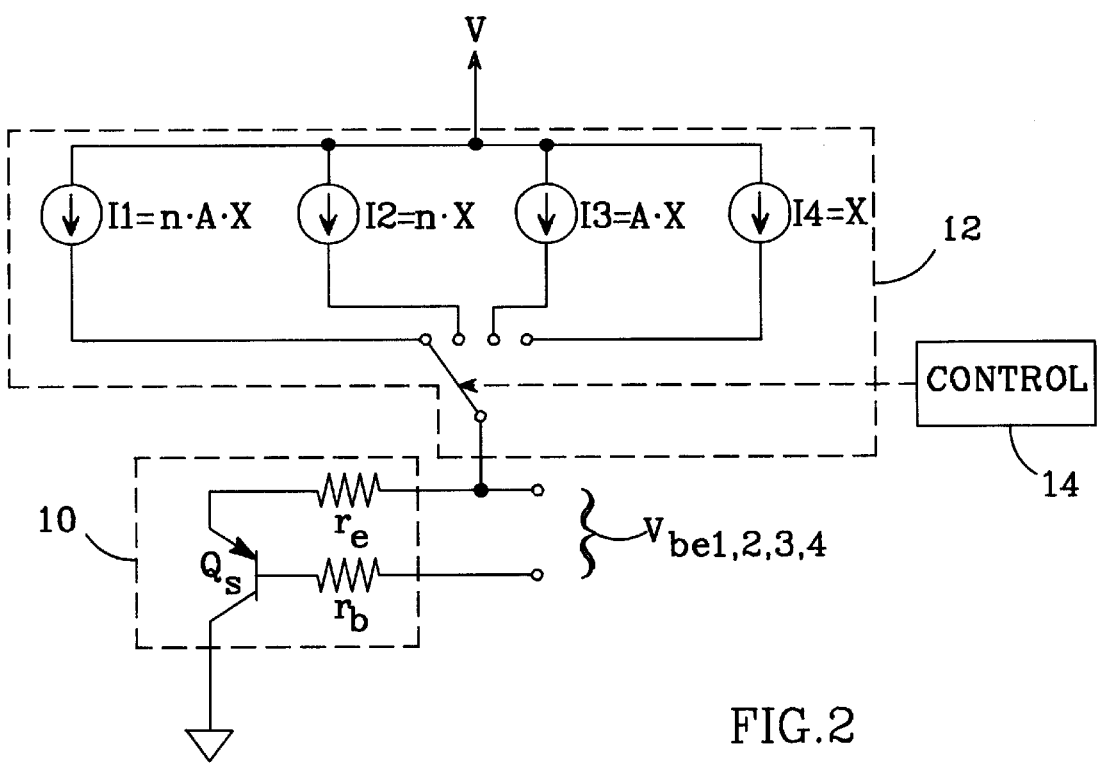
FIG. 2 is a schematic diagram of a preferred current source arrangement for the present invention.

However, transistor parameters $r_b$, $r_e$ and $\beta$ can be difficult to ascertain, and may vary from transistor to transistor. These problems are overcome when the invention is arranged in accordance with the preferred embodiment shown in FIG. 2. Here, the ratios between currents I1 and I2, and between I3 and I4, are equal to a common value "A". In addition, currents I1 and I2 are made equal to n*I3 and n*I4, respectively. When so arranged, the difference between $\Delta V_{be1}$ and $\Delta V_{be2}$ is entirely due to the effect of parasitic resistances $r_b$ and $r_e$. This arrangement results in an expression for temperature T as follows:

$$T=(q*\Delta V_{be})/[k*\ln(I1/I2)] \quad \text{(Eq. 4)}$$

where $\Delta V_{be}$ is given by:

$$\Delta V_{be}=\Delta V_{be1}-[((n/(n-1))*(\Delta V_{be1}-\Delta V_{be2})], \quad \text{(Eq. 5)}$$

and $$\Delta V_{be}=\Delta V_{be2}-[(1/(n-1))*(\Delta V_{be1}-\Delta V_{be2})], \quad \text{(Eq. 6)}$$

in which $\Delta V_{be1}=V_{be1}-V_{be2}$ and $\Delta V_{be2}=V_{be3}-V_{be4}$. Thus, when I1–I4 have the relationships specified above, errors that would otherwise be present due to the series base and emitter resistances are eliminated.

The value of n is preferably 2. When n=2, the expressions for $\Delta V_{be}$ are simplified as follows:

$$\Delta V_{be}=\Delta V_{be1}-[2*(\Delta V_{be1}-\Delta V_{be2})], \quad \text{(Eq. 7)}$$

and $$\Delta V_{be}=V_{be2}-(\Delta V_{be1}-\Delta V_{be2}). \quad \text{(Eq. 8)}$$

Making n equal to two is preferred because, assuming the voltage measurements are converted to digital values, a multiplication by two is easily accomplished by calculating $\Delta V_{be1-\Delta Vbe2}$ and performing a left-shift on the result.

Figure 3:
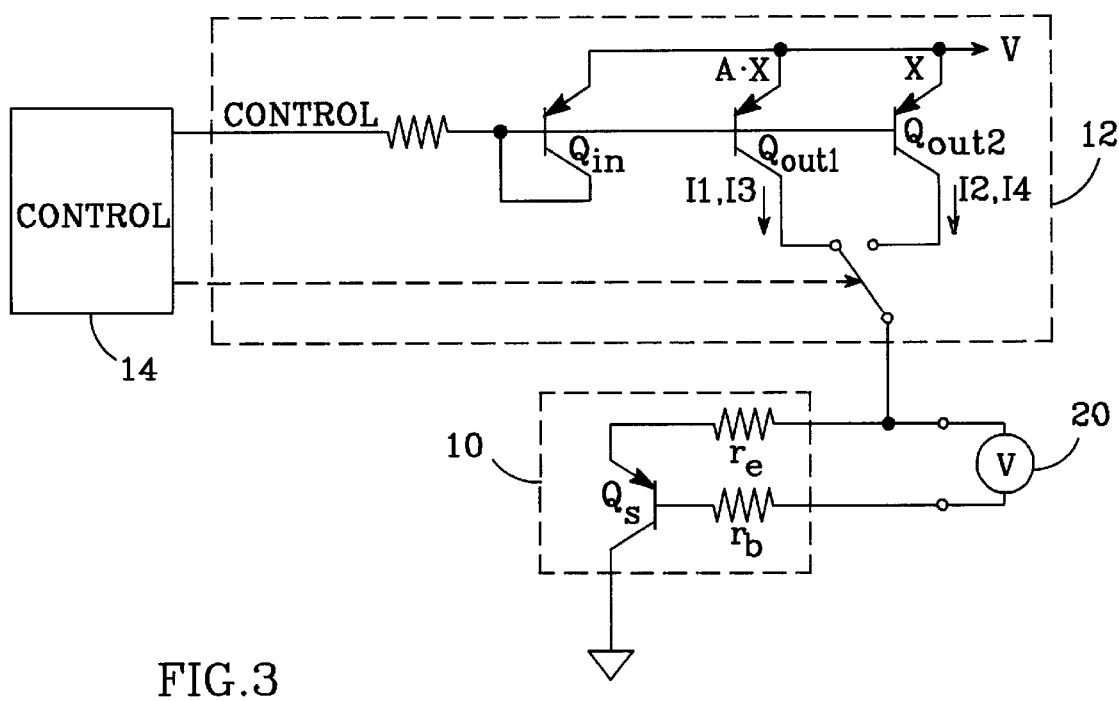
FIG. 3 is a schematic diagram showing a preferred current source implementation for the present invention.

A preferred embodiment of current source 12 is illustrated in FIG. 3. Here, current source 12 comprises a current mirror having an input transistor $Q_{in}$ and two output transistors $Q_{out1}$ and $Q_{out2}$; current ratio A is established by making the emitter area (A*X) of $Q_{out1}$ A times the emitter area of $Q_{out2}$ (X) A control signal CONTROL establishes the current in $Q_{in}$. In operation, CONTROL is set to a first value, causing $Q_{out1}$ and $Q_{out2}$ to output currents I1 and I2. A switch connects first I1, then I2, to junction 10, and a voltage measuring means 20 measures the resulting base-emitter voltages $V_{be1}$ and $V_{be2}$. The CONTROL signal is then changed such that the current in $Q_{in}$ is halved, which also halves the current in $Q_{out1}$ (I3) and $Q_{out2}$ (I4). These currents are connected to junction 10 in sequence, and $V_{be3}$ and $V_{be4}$ measured. With I1–I2 and $V_{be1}-V_{be4}$ known, $\Delta V_{be1}$ and $\Delta V_{be2}$ are calculated and provided to equation 7 or 8 to determine $\Delta V_{be1}$ which is then used by equation 4 to produce T. Operation is the same if current source 12 is arranged such that n is a value other than two, except that equation 5 or 6 must be used to calculate $\Delta V_{be}$.

Figure 4:
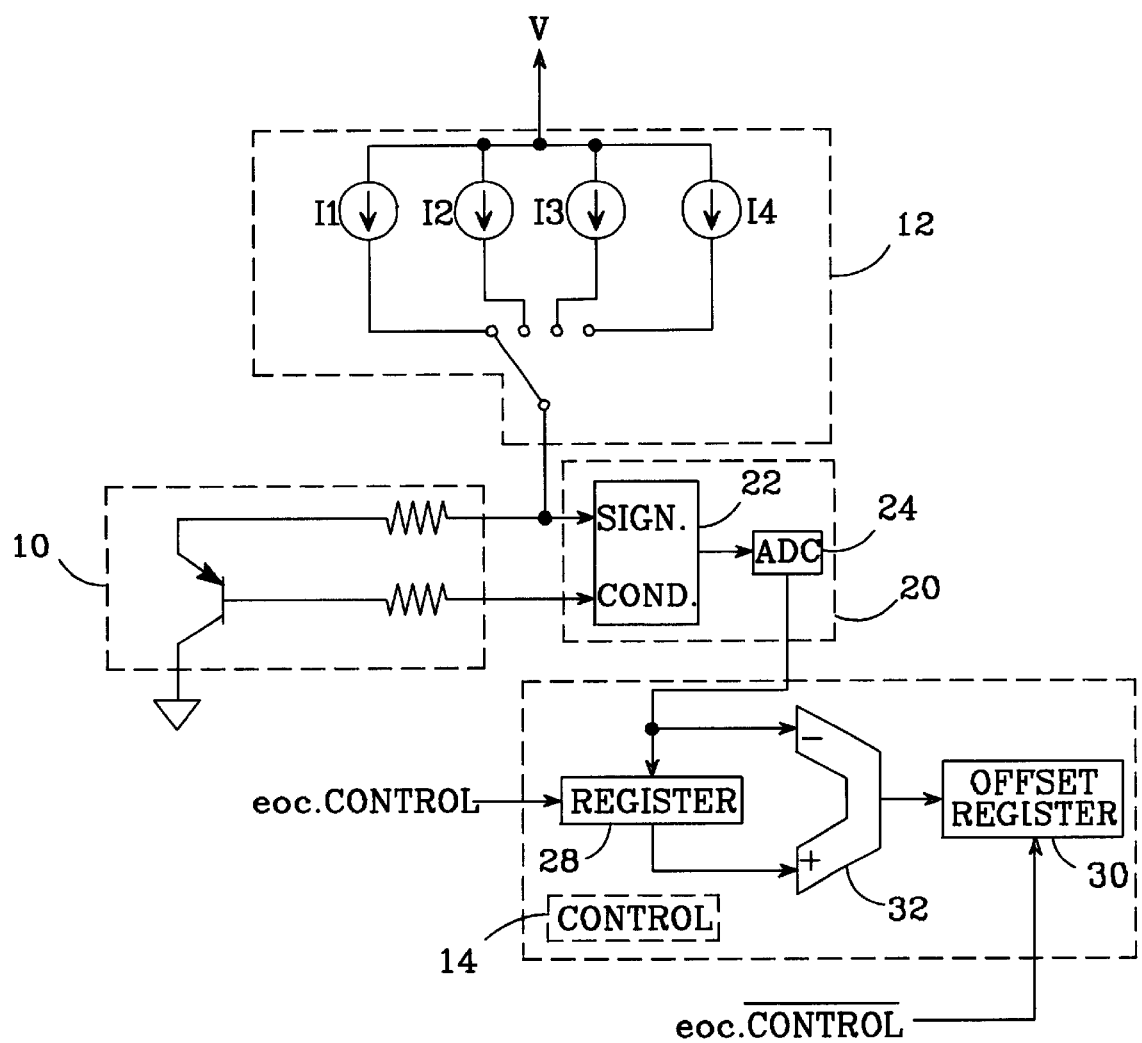
FIG. 4 is a block/schematic diagram illustrating a temperature measurement system which employs the present invention.
Figure 4:
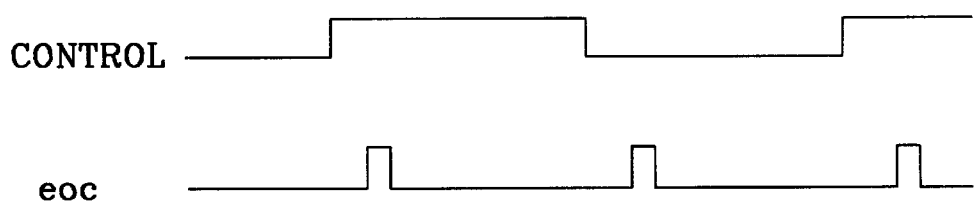

A system for determining and storing the value $\Delta V_{be1}\Delta V_{be2}$ needed in equations 5 and 6 is shown in FIG. 4. Voltage measuring means 20 is implemented with a signal conditioning circuit 22 and an analog-to-digital converter (ADC) 24. Circuit 22 samples consecutive $V_{be}$ values (e.g., $V_{be1}$ and $V_{be2}$, or $V_{be3}$ and $V_{be4}$) and provides the differences (i.e., $\Delta V_{be1}$ and $\Delta V_{be2}$) to ADC 24, which converts the $\Delta V_{be}$ values to digital form. The ADC output is provided to a processor 26 which includes a first register 28, an offset register 30, and a subtractor 32.

When CONTROL is asserted (i.e., goes high), currents I3 and I4 are successively applied to junction 10. This produces voltages $V_{be3}$ and $V_{be4}$, and signal conditioning circuit 22 calculates $V_{be3}-V_{be4}=\Delta V_{be2}$, ADC 24 converts this to a digital value, which is stored in register 28 when the conversion is complete (as indicated by the ADC's generation of the "eoc" (end-of-convert) signal). CONTROL is then deasserted, the above sequence repeats for currents I1 and I2, and a digital representation of $\Delta V_{be1}$ appears at the output of the ADC. The output of register 28 ($\Delta V_{be2}$) is subtracted from the ADC output ($\Delta V_{be1}$) by subtractor 32, with the result stored in offset register 30. This value ($\Delta V_{be2}-\Delta V_{be1}$) can then be used in equation 5, 6, 7 or 8 to produce $\Delta V_{be}$, which is used in equation 4 to calculate T. Note that, if n=2, the $\Delta V_{be1}-\Delta V_{be2}$ value stored in offset register 30 can be doubled by left-shifting the data one bit; this can be useful when using equation 7 to calculate $\Delta V_{be}$.

A controller (not shown) controls the system's operating sequence, by, for example, providing the CONTROL signal and controlling the switching between currents within current source 12. The controller function may be handled by processor 26, or may be a separate circuit block.

Signal conditioning circuit 22 might comprise, for example, a switched capacitor integrator which samples two base-emitter voltages (e.g., $V_{be1}$ and $V_{be2}$) and integrates the difference to produce the $\Delta V_{be}$ value (e.g., $\Delta V_{be1}$) provided to processor 26.

Note that the implementation shown in FIG. 4 and discussed above is merely exemplary. Many other signal conditioning circuit designs might be employed, and other topologies could be used to determine $\Delta V_{be1}-\Delta V_{be2}$. For example, rather than use a signal conditioning circuit to calculate the difference between base-emitter voltages, each base-emitter voltage might be converted to a digital value, and the digital values subtracted as necessary to determine $\Delta V_{be1}$ and $\Delta V_{be2}$. However, use of an analog signal conditioning circuit to calculate $\Delta V_{be1}$ and $\Delta V_{be2}$ is preferred, as this approach allows the base-emitter voltages to be amplified to a level sufficient for the ADC to resolve, thereby obtaining a degree of measurement resolution that would be otherwise be difficult to achieve.

While particular embodiments of the invention have been shown and described, numerous variations and alternate embodiments will occur to those skilled in the art. Accordingly, it is intended that the invention be limited only in terms of the appended claims.

We claim:

1. A transistor temperature sensing system, comprising:
   a p-n junction, said p-n junction comprising the base-emitter junction of a bipolar transistor,
   at least one current source arranged to provide four different currents to said junction in a predetermined sequence, said junction and said at least one current source arranged such that each of said four currents induces a respective voltage across said junction, and
   a voltage measurement means connected to measure each of said induced junction voltages,
   wherein said four different currents are I1, I2, I3 and I4, respectively, and wherein I1=n*I3, I2=n*I4, I1/I2=A and I3/I4=A, where A is a predetermined current ratio.

2. The temperature sensing system of claim 1, wherein said voltage measurement means produces voltage measurements $V_{be1}-V_{be2}$ and $V_{be3}-V_{be4}$ when currents I1, I2, I3 and I4 are provided to said transistor in sequence, further comprising a processor arranged to calculate the temperature T of said transistor in accordance with:

$$T=(q^*\Delta V_{be})/[k^*\ln(I1/I2)]$$

where q is the electron charge, k is Boltzmann's constant, and $\Delta V_{be}=\Delta V_{be}-[((n/(n-1))^*(\Delta V_{be1}-\Delta V_{be2})]$ and $$\Delta V_{be}=\Delta V_{be2}-[((1/(n-1))^*(\Delta V_{be1}-\Delta V_{be2})],$$

in which $\Delta V_{be1}=V_{be1}-V_{be2}$ and $\Delta V_{be2}=V_{be3}-V_{be4}$.

3. The temperature sensing system of claim 2, wherein said voltage measurement means comprises:
   a signal conditioning circuit which receives $V_{be1}$ and $V_{be2}$ and produces $\Delta V_{be1}$, and which receives $V_{be3}$ and $V_{be4}$ and produces $\Delta V_{be2}$, and
   an analog-to-digital converter (ADC) having an input which receives $\Delta V_{be1}$ and $\Delta V_{be2}$ from said signal conditioning circuit, converts $\Delta V_{be1}$ and $\Delta V_{be2}$ to respective digital values, and provides said digital values to said processor.

4. The temperature sensing system of claim 3, wherein said processor comprises at least two registers and a subtractor, said processor arranged to control said at least one current source to provide said four current values to said transistor, to receive said digital values from said ADC, and to calculate $\Delta V_{be1}-\Delta V_{be2}$, and $$\Delta V_{be1}-[((n/(n-1))^*(\Delta V_{be1}-\Delta V_{be2})] \text{ and/or}$$

$$\Delta V_{be2}-[((1/(n-1))^*(\Delta V_{be1}-\Delta V_{be2})].$$

5. A transistor temperature sensing system, comprising:
   a p-n junction,
   at least one current source arranged to provide four different currents to said junction in a predetermined sequence, said junction and said at least one current source arranged such that each of said four currents induces a respective voltage across said junction, and
   a voltage measurement means connected to measure each of said induced junction voltages,
   wherein said at least one current source comprises a current mirror having an input transistor and two output transistors, the outputs of said output transistors connected to provide two of said four different currents when said input transistor is driven with a first current and the other two of said four different currents when said input transistor is driven with a second current.

6. A transistor temperature sensing system, comprising:
   a bipolar transistor,
   at least one current source arranged to provide currents I1, I2, I3 and I4 to said transistor in a predetermined sequence, wherein I1=2*I3, I2=2*I4, I1/I2=A and I3/I4=A, where A is a predetermined current ratio, said transistor and said at least one current source arranged such that each of I1, I2, I3 and I4 induces a respective voltage between said transistor's base and emitter,
   a voltage measurement means connected to produce voltage measurements $V_{be1}-V_{be2}$ and $V_{be3}-V_{be4}$ when currents I1, I2, I3 and I4 are provided to said transistor in sequence, and
   a processor arranged to calculate the temperature T of said transistor in accordance with:

$$T=(q^*\Delta V_{be})/[k^*\ln(I1/I2)]$$

where q is the electron charge, k is Boltzmann's constant, and $\Delta V_{be}=\Delta V_{be1}-[2^*(\Delta V_{be1}-\Delta V_{be2})]$ and $$V_{be}=\Delta V_{be2}-(\Delta V_{be1}-\Delta V_{be2}),$$

in which $\Delta V_{be1}=V_{be1}-V_{be2}$ and $\Delta V_{be2}=V_{be3}-V_{be4}$.

7. The temperature sensing system of claim 6, wherein said voltage measurement means comprises:
   a signal conditioning circuit which receives $V_{be1}$ and $V_{be2}$ and produces $\Delta V_{be1}$, and which receives $V_{be3}$ and $V_{be4}$ and produces $\Delta V_{be2}$ and
   an analog-to-digital converter (ADC) having an input which receives $\Delta V_{be1}$ and $\Delta V_{be2}$ from said signal conditioning circuit, converts $\Delta V_{be1}$ and $\Delta V_{be2}$ to respective digital values, and provides said digital values to said processor.

8. The temperature sensing system of claim 7, wherein said processor comprises first and second registers and a subtractor, said processor arranged to control said at least one current source to provide said four current values to said transistor, to receive said digital values from said ADC, and to calculate $\Delta V_{be1-\Delta Vbe2}$, and $\Delta V_{be1}-[2^*(\Delta V_{be1}-\Delta V_{be2})]$ and/or $\Delta V_{be2}-(\Delta V_{be1}-\Delta V_{be2})$.

9. The temperature sensing system of claim 8, wherein said at least one current source comprises a current mirror having an input transistor and two output transistors, the outputs of said output transistors connected to provide two of said four different currents when said input transistor is driven with a first current and the other two of said four different currents when said input transistor is driven with a second current, said processor further arranged to control the current provided to said input transistor.

10. A temperature sensing method, comprising:

forcing currents I1, I2, I3 and I4 through a p-n junction in sequence, wherein I1=n*I3, I2=n*I4, I1/I2=A and I3/I4=A, where A is a predetermined current ratio, such that I1, I2, I3 and I4 produce respective voltages V1, V2, V3 and V4 across said junction, measuring V1, V2, V3 and V4, determining the temperature T of said junction in: accordance with:

$$T=(q*\Delta V_{be})/[k*\ln(I1/I2)]$$

where q is the electron charge, k is Boltzmann's constant, and $\Delta V_{be}=\Delta V_{be1}-[((n/(n-1))*(\Delta V_{be1}-\Delta V_{be2})]$ and $$\Delta V_{be}=\Delta V_{be2}-[((1/(n-1))*(\Delta V_{be1}-\Delta V_{be2})],$$

in which $\Delta V_{be1}=V1-V2$ and $\Delta V_{be2}=V3-V4$.

11. The method of claim 10, wherein said p-n junction comprises a bipolar transistor and said currents I1, I2, I3 and I4 produce respective voltages V1, V2, V3 and V4 across said transistor's base-emitter junction.

12. The method of claim 10, wherein n=2 and $$\Delta V_{be}=\Delta V_{be1}-[2*(\Delta V_{be1}-\Delta V_{be2})] \text{ and}$$

$$\Delta V_{be}=\Delta V_{be2}-(\Delta V_{be1}\Delta V_{be2}).$$

* * * * *